(12) United States Patent
Carlos M.

(10) Patent No.: US 11,986,766 B2
(45) Date of Patent: May 21, 2024

(54) INSTALLATION AND METHOD FOR RECOVERING GASEOUS SUBSTANCES FROM GAS FLOWS

(71) Applicant: BLUEGENERATION, S.L., Madrid (ES)

(72) Inventor: Padilla Moreno Carlos M., Madrid (ES)

(73) Assignee: BLUEGENERATION, S.L., Madrid (ES)

( * ) Notice: Subject to any disclaimer, the term of this patent is extended or adjusted under 35 U.S.C. 154(b) by 504 days.

(21) Appl. No.: 17/280,686

(22) PCT Filed: Sep. 11, 2019

(86) PCT No.: PCT/ES2019/070601
§ 371 (c)(1),
(2) Date: Mar. 26, 2021

(87) PCT Pub. No.: WO2020/065107
PCT Pub. Date: Apr. 2, 2020

(65) Prior Publication Data
US 2022/0001324 A1   Jan. 6, 2022

(30) Foreign Application Priority Data

Sep. 29, 2018  (ES) .................................. 201830944

(51) Int. Cl.
*B01D 53/04* (2006.01)
*B01D 51/10* (2006.01)
(Continued)

(52) U.S. Cl.
CPC ......... *B01D 53/0476* (2013.01); *B01D 51/10* (2013.01); *B01D 53/053* (2013.01);
(Continued)

(58) Field of Classification Search
CPC .. B01D 53/0476; B01D 51/10; B01D 53/053; B01D 53/265; B01D 2257/504;
(Continued)

(56) References Cited

U.S. PATENT DOCUMENTS 1,683,567 A * 9/1928 Ferry ...................... F03B 15/02
 415/196
61,747 A   2/1967 Manning
(Continued)

FOREIGN PATENT DOCUMENTS

| EP | 0449576 A1 | 10/1991 |
| EP | 1500424 A1 | 1/2005 |

(Continued)

*Primary Examiner* — Stephen Hobson
(74) *Attorney, Agent, or Firm* — ASLAN LAW, P.C.

(57) ABSTRACT

An installation and method for recovering gaseous substances from gas flows comprising a first gas-treatment module (module 1) to receive a first inlet gas flow (1) in which the temperature and pressure are controlled in order to dry said flow by removing water, nitrogen and sulfur oxides, unburned substances and other solids in suspension, a second $CO_2$ separation module (module 2) in which the first outlet flow (13) from module 1 is treated using a PSA adsorption/desorption process to separate the gases selected, thereby enriching the third outlet flow (27), and a third, optional module (module 3) in which the $CO_2$ purification process is carried out and in which the third outlet flow (27) from module 2 is treated using a PSA adsorption/desorption process to separate the gases selected, thereby enriching the fifth outlet flow (44) from module 3.

18 Claims, 5 Drawing Sheets

(51) Int. Cl.
*B01D 53/047* (2006.01)
*B01D 53/053* (2006.01)
*B01D 53/26* (2006.01)

(52) U.S. Cl.
CPC ...... *B01D 53/265* (2013.01); *B01D 2257/504* (2013.01); *B01D 2259/40007* (2013.01)

(58) Field of Classification Search
CPC ...... B01D 2259/40007; B01D 53/0407; B01D 2253/108; B01D 2257/108; B01D 2257/304; B01D 53/002; B01D 2257/50; B01D 2257/7025; B01D 53/047; Y02C 20/20; Y02C 20/40
See application file for complete search history.

(56) References Cited

U.S. PATENT DOCUMENTS

| | | | | |
|---|---|---|---|---|
| 3,430,418 A * | 3/1969 | Wagner | C01B 3/56 | 95/122 |
| 3,564,816 A * | 2/1971 | Batta | B01D 53/047 | 95/143 |
| 3,885,927 A * | 5/1975 | Sherman | B01D 53/02 | 95/139 |
| 3,944,400 A * | 3/1976 | Bird | C01B 23/00 | 96/111 |
| 3,986,849 A * | 10/1976 | Fuderer | C01B 3/56 | 95/100 |
| 4,315,759 A * | 2/1982 | Benkmann | B01D 53/047 | 95/98 |
| 4,323,370 A * | 4/1982 | Leitgeb | B01D 53/04 | 95/138 |
| 4,472,177 A * | 9/1984 | Sircar | B01D 53/0476 | 96/111 |
| 4,539,019 A * | 9/1985 | Koch | B01D 53/0476 | 96/113 |
| 4,605,425 A * | 8/1986 | Verrando | B01D 53/261 | 96/111 |
| 4,643,743 A * | 2/1987 | Grader | B01D 53/047 | 95/100 |
| 4,693,730 A * | 9/1987 | Miller | B01D 53/047 | 96/417 |
| 4,696,680 A * | 9/1987 | Ghate | B01D 53/0476 | 95/143 |
| 4,725,293 A * | 2/1988 | Gunderson | B01D 53/0454 | 96/110 |
| 4,770,676 A * | 9/1988 | Sircar | B01D 53/047 | 95/99 |
| 4,810,265 A * | 3/1989 | Lagree | B01D 53/0476 | 95/902 |
| 4,857,086 A * | 8/1989 | Kawai | B01D 53/0454 | 96/111 |
| 4,927,434 A * | 5/1990 | Cordes | B01D 53/0454 | 96/417 |
| 5,042,994 A * | 8/1991 | Smolarek | B01D 53/047 | 96/115 |
| 5,112,367 A * | 5/1992 | Hill | B01D 53/0423 | 95/98 |
| 5,112,590 A * | 5/1992 | Krishnamurthy | C01B 3/34 | 423/652 |
| 5,258,056 A * | 11/1993 | Shirley | B01D 53/047 | 95/138 |
| 5,268,021 A * | 12/1993 | Hill | B01D 53/0423 | 95/902 |
| 5,407,465 A * | 4/1995 | Schaub | B01D 53/0476 | 95/101 |
| 5,441,559 A * | 8/1995 | Petit | B01D 53/06 | 96/144 |
| 5,529,763 A * | 6/1996 | Peng | B01J 20/28061 | 423/247 |
| 5,614,000 A * | 3/1997 | Kalbassi | B01D 53/047 | 95/115 |
| 5,689,974 A * | 11/1997 | Fujita | F25J 3/04169 | 62/908 |
| 5,906,675 A * | 5/1999 | Jain | F25J 3/04163 | 95/143 |
| 5,914,455 A * | 6/1999 | Jain | B01D 53/0462 | 95/122 |
| 5,931,022 A * | 8/1999 | Deng | B01D 53/047 | 62/643 |
| 5,938,819 A * | 8/1999 | Seery | B01D 53/053 | 95/902 |
| 5,968,234 A * | 10/1999 | Midgett, II | F25J 3/04775 | 95/123 |
| 5,989,313 A * | 11/1999 | Mize | F25J 3/04169 | 95/96 |
| 6,106,593 A * | 8/2000 | Golden | B01D 53/0462 | 96/132 |
| 6,273,939 B1 * | 8/2001 | Millet | B01D 53/02 | 95/902 |
| 6,277,174 B1 * | 8/2001 | Neu | B01D 53/0476 | 96/111 |
| 6,358,302 B1 * | 3/2002 | Deng | B01D 53/02 | 95/902 |
| 6,362,122 B1 * | 3/2002 | Cannan | B01J 20/345 | 502/25 |
| 6,402,809 B1 * | 6/2002 | Monereau | F25J 3/04775 | 95/123 |
| 6,402,814 B1 * | 6/2002 | Kraus | F25J 3/04412 | 95/120 |
| 6,458,478 B1 * | 10/2002 | Wang | C01B 3/342 | 429/430 |
| 6,511,640 B1 * | 1/2003 | Kumar | B01D 53/0462 | 423/247 |
| 6,514,318 B2 * | 2/2003 | Keefer | B01D 53/0431 | 96/132 |
| 6,599,347 B2 * | 7/2003 | Kalbassi | B01D 53/261 | 96/111 |
| 6,712,876 B2 * | 3/2004 | Cao | B01D 53/047 | 96/111 |
| 6,911,066 B2 * | 6/2005 | Monereau | C01B 3/56 | 95/55 |
| 6,962,654 B2 * | 11/2005 | Arnaud | B01D 21/2433 | 210/143 |
| 6,994,111 B2 * | 2/2006 | Cox | B01J 47/022 | 137/561 A |
| 7,439,273 B2 * | 10/2008 | Woods | C01B 3/34 | 518/700 |
| 7,445,660 B2 * | 11/2008 | Hart | B01D 53/047 | 96/115 |
| 7,445,663 B1 * | 11/2008 | Hunter | B01D 53/047 | 128/205.24 |
| 7,789,939 B2 * | 9/2010 | Blouin | F25J 3/04775 | 95/96 |
| 7,846,237 B2 * | 12/2010 | Wright | B01D 53/047 | 96/11 |
| 7,993,431 B2 * | 8/2011 | Nakamura | B01D 53/04 | 96/108 |
| 8,012,446 B1 * | 9/2011 | Wright | B01D 53/02 | 95/137 |
| 8,052,777 B2 * | 11/2011 | Sechrist | B01J 8/0278 | 95/96 |
| 8,216,344 B2 * | 7/2012 | Degenstein | B01D 53/60 | 95/137 |
| 8,268,043 B2 * | 9/2012 | Celik | B01D 53/0407 | 95/96 |
| 8,623,118 B2 * | 1/2014 | Belanger | F04D 27/0261 | 95/96 |
| 8,940,263 B2 * | 1/2015 | Golden | B01D 53/864 | 423/247 |
| 9,199,847 B2 * | 12/2015 | Hilbig | B01D 71/024 | |
| 9,387,430 B2 * | 7/2016 | Ho | B01D 53/047 | |
| 9,458,024 B2 * | 10/2016 | Merritt | B01D 53/1475 | |
| 9,644,893 B2 * | 5/2017 | Wright | F26B 21/12 | |
| 9,957,161 B2 * | 5/2018 | Merritt, Jr. | C10G 2/30 | |
| 10,035,099 B2 * | 7/2018 | Yoshikawa | B01D 53/04 | |
| 10,427,090 B2 * | 10/2019 | Dube | C10K 1/32 | |
| 10,584,633 B2 * | 3/2020 | Dunn | F02C 6/18 | |

(56) References Cited

U.S. PATENT DOCUMENTS

| | | | |
|---|---|---|---|
| 10,835,861 B2* | 11/2020 | Friesen | B01D 53/261 |
| 11,433,346 B2* | 9/2022 | Wang | B01D 53/0473 |
| 11,465,094 B2* | 10/2022 | Rah | B01D 53/0438 |
| 2002/0004157 A1* | 1/2002 | Keefer | H01M 8/0662 |
| | | | 429/415 |
| 2002/0110504 A1* | 8/2002 | Gittleman | H01M 8/0662 |
| | | | 423/247 |
| 2003/0047037 A1* | 3/2003 | Sethna | C21B 13/0073 |
| | | | 75/505 |
| 2003/0064014 A1* | 4/2003 | Kumar | B01D 53/8671 |
| | | | 423/247 |
| 2003/0164092 A1* | 9/2003 | Golden | B01J 20/103 |
| | | | 96/132 |
| 2004/0179998 A1* | 9/2004 | Gittleman | C01B 3/56 |
| | | | 48/128 |
| 2013/0061747 A1* | 3/2013 | Turnbull | B01D 53/0454 |
| | | | 96/111 |
| 2023/0385411 A1* | 11/2023 | Moreno | G06F 21/556 |

FOREIGN PATENT DOCUMENTS

| | | |
|---|---|---|
| EP | 1574246 A1 | 9/2005 |
| EP | 1226860 B1 | 9/2006 |
| ES | 2407584 A2 | 6/2013 |
| ES | 2407584 A2 | 6/2013 |
| WO | WO2009073928 | 6/2009 |

* cited by examiner

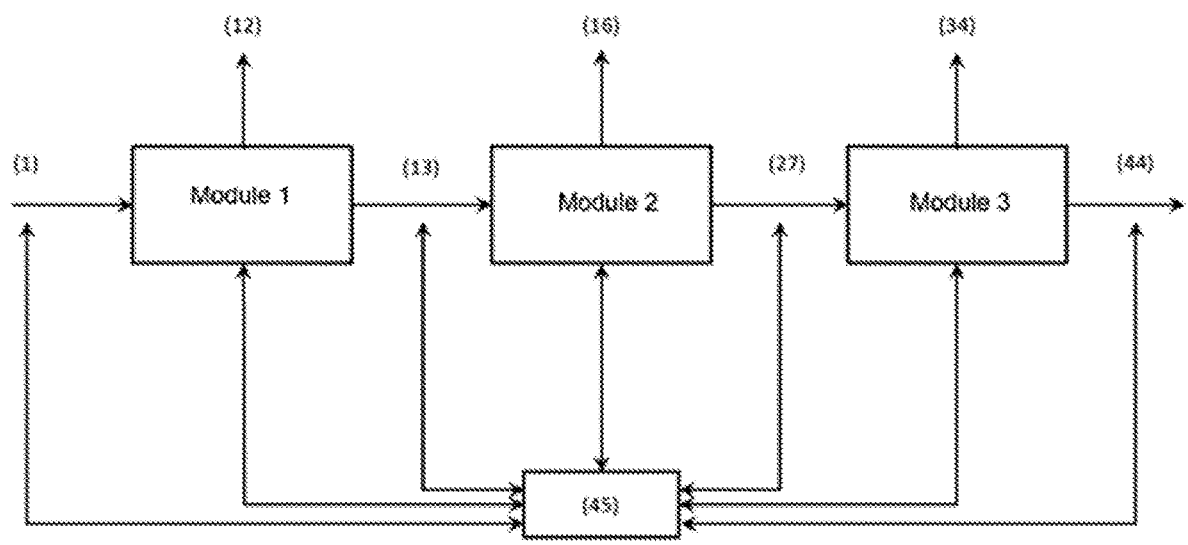
Figure 1.- General view of the device of the invention and its operation

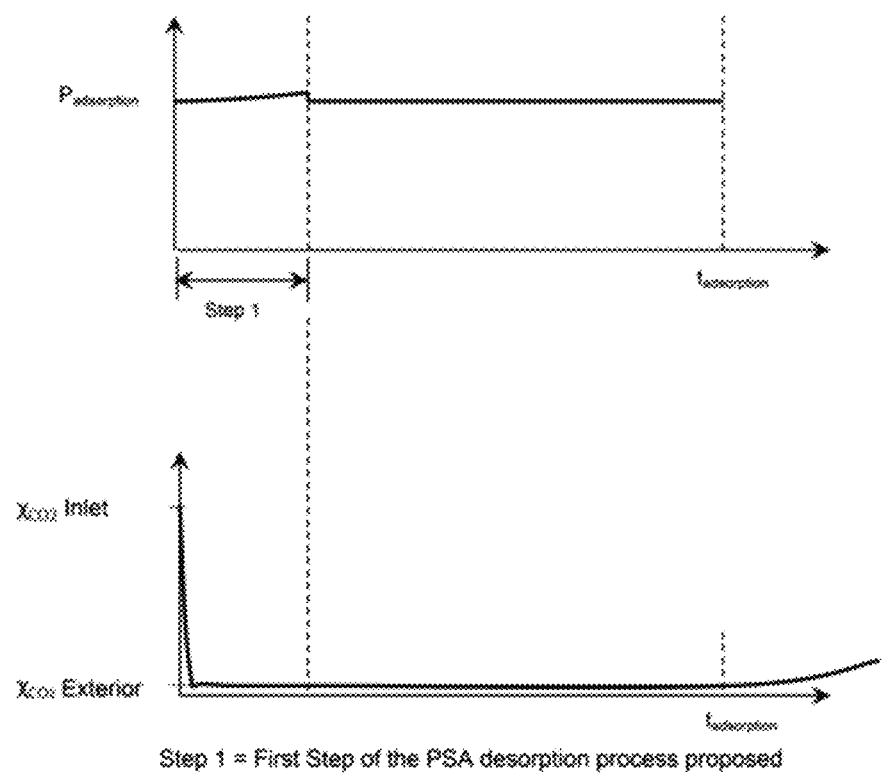
Figure 2.- Evolution of the key parameters of the adsorption process in the device of the invention a) = Stage 1 = First Stage of the PSA dropout process proposed. Recirculation of desorbed gases.
(b) = Stage 2 = Second Stage of the PSA attrition process proposed. Dropout to vacuum.
(c) = Stage 3 = Third Stage of the PSA attrition process proposed. Dropout by dragging.

Figure 3.- Stages of the PSA desorption process of the invention and its operation

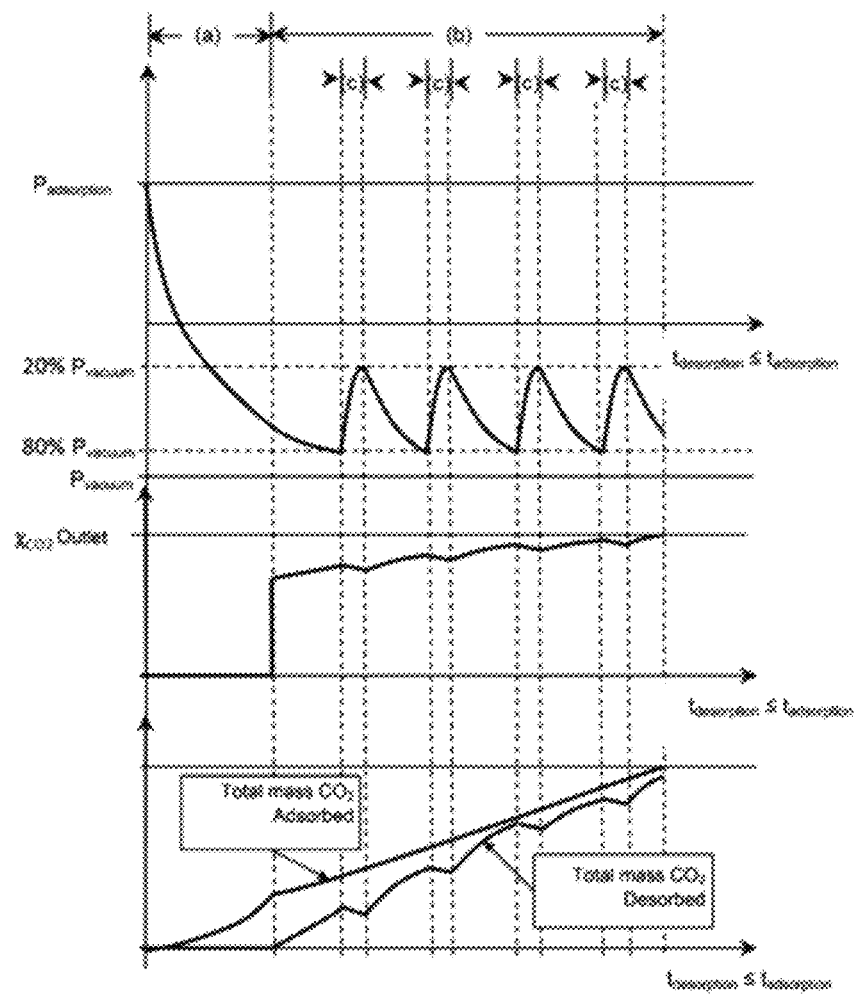
Figure 4. Evolution of the key parameters of the desorption process in the device of the invention

INSTALLATION AND METHOD FOR RECOVERING GASEOUS SUBSTANCES FROM GAS FLOWS

CROSS-REFERENCE TO RELATED APPLICATIONS

This application claims priority to ES Patent Application No. 201830944 filed on Sep. 29, 2018, and this application claims priority to and is a 371 of international PCT Application No. PCT/ES2019/070601 filed on Sep. 11, 2019, the entire contents of which are hereby incorporated by reference.

OBJECT OF THE INVENTION

The present invention can be included in the technical field of the treatment of any gas flow made up of atmospheric gases, particularly, from the treatment of combustion exhaust gases, among other mixtures.

Said installation and method can be applied for the recovery of any gaseous substance which is forming part of the gas flow to be separated.

The object of the invention relates to an installation, the control system thereof and a method for recovering substances, in particular greenhouse gases, mainly carbon dioxide ($CO_2$), from gas flows, depleting said gas flows in the recovered substances.

BACKGROUND OF THE INVENTION

In the next few years, based on compliance with EU regulations and the COP21 (Paris) and Kyoto agreements, it will be necessary to reduce the emission of greenhouse gases beyond what can be reduced by means of energy efficiency techniques and by substitution with renewable energy sources. The most important of said greenhouse gases is $CO_2$, although it is not the only one.

One of the ways to carry out reductions in the emissions of said gases is to use means for separating the gaseous substances contained in gas flows with the objective of capturing the greenhouse gases.

Until now, the methods used for the separation of gaseous substances were mainly focused on physical-chemical processes which seek to use the polarity/apolarity, the molecular size, the oxidizing/reducing characteristics and the change in state of the substances making up the gas flow. Said methods are highly demanding in amounts of energy and/or comprise the elaboration of intermediate chemical products which are harmful to the environment, which implies high safety costs in order to avoid the release into the atmosphere of said harmful products.

Comparing with different previous patents, it is observed that the system proposed as device of the present invention is substantially different for the preferred embodiment of the present invention.

Patent U.S. Pat. No. 8,052,777 describes chambers for PSA (Pressure Swing Adsorption) processes with internal partitions for homogeneous flow distribution. These systems can contain one or more walls which make up different beds of adsorbent material, leaving two differentiated bell-shaped sides in order to diffuse the flow in the chamber. This system with two chambers operating in a false continuous process, one adsorbing and another desorbing, in a PSA process. It was initially created to purify flows of $H_2$ with a high percentage of this gas, and with adsorbent material such as Zeolite A or X, aluminas, etc. The system describes the PSA process directly without the ability to enable control over the concentration of the outlet flows (27) or (44) of the system proposed as device of the present invention.

Patent U.S. Pat. No. 8,268,043B2 describes a compact and modular structure of adsorbent beds. In comparison with conventional chambers with beds, this structure has a plurality of beds connected in order to form the integrated structure. It offers a high separation capacity per unit volume compared to conventional ones. The modular design presented returns low manufacturing costs and ease in transportation of the assembly and repairs, as well as increased simplicity when loading adsorbent material. It is suitable for housing adsorbents with the aim of capturing $CO_2$, $N_2$ or $H_2O$. The system describes the PSA process directly without the ability to enable control over the concentration of the outlet flows (27) or (44) of the system proposed as device of the present invention.

Patent U.S. Pat. No. 6,994,111. The present design is an improvement on conventional adsorption chambers, the work of which is in plug-flow fluid applications, processes with an inlet and an outlet in which a uniform flow distribution therein is desired (chromatography applications or processes with adsorption beds). The proposed chamber is a toroidal chamber which enables an efficient laminar distribution, in which the chamber design pursues concise objectives, these being treating a flow with distributions which are uniform, homogeneous and with large exchange areas. The toroidal chamber has inputs in the lower portion and outputs in the upper portion. The system describes the PSA process directly without the ability to enable control over the concentration of the outlet flows (27) or (44) of the system proposed as device of the present invention.

Patent U.S. Pat. No. 1,683,567A2. In this case, the system is made up of multi-chambers. One of the internal rings or sub-chambers of the system houses the adsorbent material, while the other chamber contains a material inert to the adsorption process which is created in the first, both separated by a permeable gas or liquid. The gas inlet to be processed is introduced through the feed and is processed while it flows to the outermost ring, being extracted through the connection to the outside. It is a device similar to the one analyzed in the previous U.S. Pat. No. 6,994,111, the main difference between the two being the guiding of the effluent through the inside of the chamber, from the inner concentric ring to the outer one. The system describes the PSA process directly without the ability to enable control over the concentration of the outlet flows (27) or (44) of the system proposed as device of the present invention. Furthermore, this system requires other intermediate substances for the operation thereof in addition to the initial adsorbent porous material.

Patent EP1500424A1, Multi-chamber system for PSA processes. An initial chamber receives the compressed fluid for the process and distributes it uniformly to the sieves with adsorbent material such as Zeolite. The chambers have multiple internal compartments for, among other objectives, maintaining a uniform temperature in chambers, which further serves to promote adsorption and not have large thermal gradients which would disturb the uniformity of the concentration of the gas in the chamber. It is intended to improve the PSA adsorption process initially designed in order to treat atmospheric air which will be fed through the compressor that is seen in the figure in the upper portion of the chamber. The chamber is not compartmentalized concentrically but rather with an arrangement of parallel axes. The system describes the PSA process directly without the ability to enable control over the concentration of the outlet flows (27) or (44) of the system proposed as device of the present invention.

Patent U.S. Pat. No. 5,931,022. It uses an alumina adsorbent, such as Zeolite 13X (negatively charged aluminosilicates), in PSA processes for purification of gas flows by removing $CO_2$. A process for regenerating the adsorbent is proposed, according to which the adsorbent bed will be heated to a certain temperature, removing the stored traces of $CO_2$ and $H_2O$ from the material. This process is necessary since, despite the initial conditioning, a small percentage of water always enters in vapor form, which after certain adsorption/desorption cycles weakens the adsorbent capacity of the Zeolite. The proposed process has a periodic heating after certain cycles of adsorption/desorption, heating. This system uses adsorbent material such as Zeolite X. PSA processes for capturing $CO_2$. Regeneration of the bed after successive adsorption/desorption cycles in order to remove the residual $CO_2$ and $H_2O$ not desorbed in the desorption phase by means of the application of heat (thermal regeneration). The temperature of the thermal regeneration, when dealing with processes such as those disclosed in the patent, is in the optimal range of (100-250° C.). The system describes the PSA process directly without the ability to enable control over the concentration of the outlet flows (27) or (44) of the system proposed as device of the present invention. Likewise, it introduces heating of the fluid bed in order to improve the cyclical regeneration capacity thereof. It is a PTSA process, completely different from the PSA process proposed as the device of the present invention.

Patent U.S. Pat. No. 6,362,122 discloses a process for the regeneration of Zeolite composite materials after the use thereof in adsorption, for example in adsorption of carbonaceous composites. The process consists of putting the material in contact with a caustic solution, such as sodium hydroxide, isolation of the compound, washing with water, drying and, finally, calcination. The result is a regenerated material. The contact with the aqueous caustic solution is performed between 20 and 110° C. for a time of 1 to 48 hours, then it is washed with water and is dried. The calcination phase is performed between 500 and 700° C. for a time of 1 to 24 hours. It uses the regeneration of adsorbent materials, Zeolites being among those apt. Proposal of regeneration with caustic solution, sequence of the process: Contact with solution under isolation conditions (20/110° C.; ¼8 hours). Contact with $H_2O$ and subsequent drying. Calcination (500/700° C.; ½4 hours). It is a PTSA (Pressure and Thermal Swing Adsorption) process, completely different from the PSA process proposed as the device of the present invention which does not require cyclic regeneration.

Patent U.S. Pat. No. 6,402,814. The described regeneration process, which entails depressurization of the chambers after the adsorption, it includes a heating phase, during which the porous bed is purged with a gas, and a cooling phase, during which the porous bed is purged with a cooling gas. The process refers to the treatment of beds in TSA (Thermal Swing Adsorption) processes with alumina or zeolite adsorbents (X, L, XLA, etc.) for purifying air flows (removing $CO_2$ and $[H_2O]v$) destined for cryogenic of distillation plants located downstream. This process was designed for the regeneration of type X, L and XLA Zeolites and was initially designed to work in TSA processes. Succession of the process proposed in the patent: Depressurization of chamber after adsorption. Heating. Purging with gas. Cooling with gas. It is a TSA process, completely different from the PSA process proposed as the device of the present invention.

Document EP1574246A1 describes an improved TSA system for preventing damage caused by water in the system for adsorbing $CO_2$ from gas flows, adsorbing with Zeolite X. This fact is solved by heating the adsorbent bed periodically to a temperature higher than the normal temperature of the desorption phase. It is presented as an alternative, or complement, to the typical dehumidification processes wherein the gas flow is made to flow through a bed, before the chamber, made of silica gel or alumina. Regeneration in TSA process. Proposed process: It is initially adsorbed by contacting the gas flow with a selective adsorbent in order to remove the desired components from the flow. Once the adsorption is finished, it is regenerated by heating at a temperature in the range of (40-400) ° C. Cooling of chamber and porous bed to the initial process temperature. Periodically, and not between cycles, a second regeneration is performed preferably between 200 and 400° C., the temperature also being, in a second phase of experimentation, strictly 50° C. or more above that of the first regeneration (first regeneration: between 40 and 400° C.). It is a TSA process, completely different from the PSA process proposed as the device of the present invention which does not require cyclic regeneration.

Patent U.S. Pat. No. 5,968,234A deals with a system for regeneration of adsorbent materials such as Zeolite X, Y, A, silica gel, chabazite, mordenite and mixtures thereof when they begin to have low yields in the adsorption of $CO_2$. In order to perform the proposed thermal regeneration, a flow enriched in $N_2$ is used, specifically using the flow formed by the molecules not captured by the material during the adsorption phase. This regenerative flow undergoes a multi-step compression process before regenerating, which provides it with a considerable increase in pressure. The regeneration for adsorbent materials such as Zeolite X, Y, A, . . . , which have been used in processes for capturing $CO_2$ and/or $[H_2O]_v$. By means of a multi-step compression process, the portion of the flow not adsorbed at high pressure is introduced into the chamber. The high-pressure flow will be highly enriched in $N_2$ and will be prevented from having traces of $CO_2$ and $H_2O$ as well as hydrocarbons. It is a process for regenerating porous materials, not for separating or purifying, completely different from the PSA process proposed as the device of the present invention.

Patent U.S. Pat. No. 5,938,819A. The separation in PSA process in large amounts of $CO_2$ of an effluent mainly made up of $CH_4$, the adsorbent is a type rich in natural Na. The removal in the regeneration of the residual $CO_2$ which collapses and shrinks the adsorbent material is performed at moderate pressures, close to atmospheric pressure, and with a high volume of air. In this manner, the $CO_2$ performs a leaching process (in metallurgy: extraction from a mineral of a species of interest by means of reagents) and leaves the adsorbent bed, restoring the adsorbent capacity. By evaluating results with different modes of operation, it is determined that the large amount of air is more influential than the high pressure. It is a PSA process for adsorbing $CO_2$ and generating effluent rich in $CH_4$ by means of the use of material rich in natural Na. In the regeneration phase, instead of using high pressures to attack the material, it is subjected to moderate pressures but at high volumes of air. The system describes the PSA process directly without the ability to enable control over the concentration of the outlet flows (27) or (44) of the system proposed as device of the present invention.

Patent U.S. Pat. No. 5,906,675A deals with a three-phase process with three tanks/vessels/reactors in parallel in order to achieve a false continuous process. While the first tank/vessel/reactor is in adsorption, the second is in vacuum desorption and the third one is in regeneration by thermal heating to 180° F. The false continuous process is achieved by alternating the three phases sequentially. This system seeks for the desorption to be produced in two steps, in a first step, in the tank/vessel/reactor which is in vacuum desorption, the extraction of a large part of the captured gas is produced and in the second, the other gas is extracted by increasing the temperature, achieving, apart from finishing the desorption process, removing impurities and captured water. Therefore, it is a modified PTSA process. At least three problems can be observed in this document: 1) That it does not achieve the operation of the system being able to last and be maintained continuously over time, maintaining the integrity of the adsorbent material (Zeolite 13X, Activated Carbon, . . . ). 2) That no improvement is achieved in the concentration of the gas to be separated from the outlet gas flow from the system after the capture and concentration thereof in a single step and 3) that it does not enable the operation of the system to be continuous in order to be applied to greenhouse gas emission systems without interfering with the normal operation thereof.

BRIEF DESCRIPTION OF THE DRAWINGS

To complement the description that is being made and for the purpose of helping to better understand the features of the invention, a set of drawings is attached as an integral part of said description, a set of drawings wherein the following has been depicted, with an illustrative and non-limiting character:

FIG. 1.—General view of the device of the invention and the operation thereof.

FIG. 2.—Evolution of the key parameters of the adsorption process in the device of the invention.

FIG. 3.—Stages of the PSA desorption process.

FIG. 4.—Evolution of the key parameters of the desorption process.

DESCRIPTION OF THE INVENTION

Figure 5:
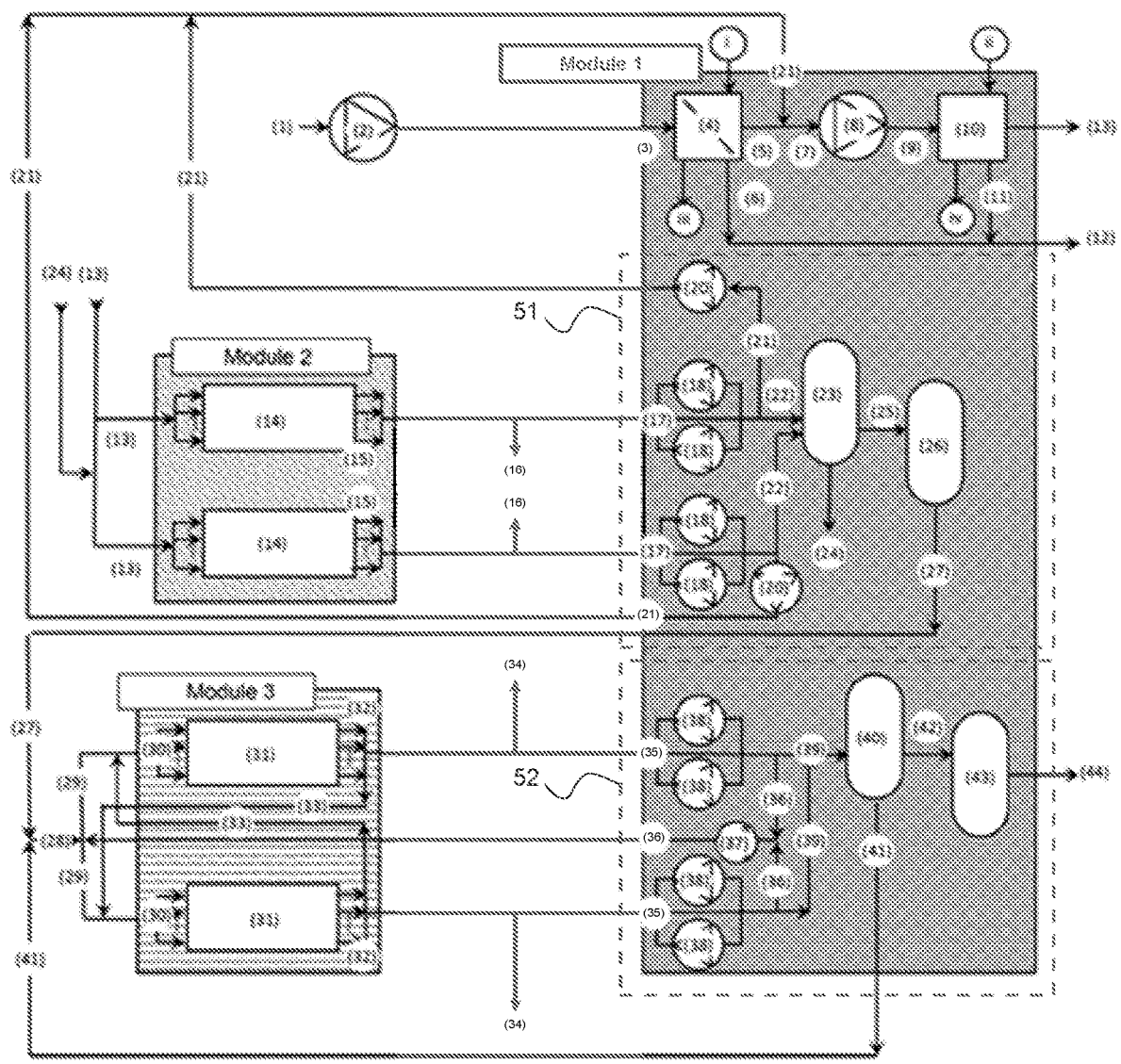
FIG. 5.—View of the installation of the invention and the operation thereof.

The present invention describes a device and a method for recovering gaseous substances from gas flows. Said method is based on performing the PSA adsorption/desorption process of the gas flow although by means of an inert adsorbent porous material selective to the gaseous substance to be separated, performed under operating conditions and by means of a method which enables efficiencies similar to the other existing systems at very competitive costs in comparison.

The invention is applicable to a multitude of gaseous substances, although substances which are within the group of greenhouse gases are preferred, mainly carbon dioxide, although the invention is also viable for recovering other greenhouse effect substances, such as water vapor, suspended particles, nitrogen oxides and sulfur oxides.

The method of the invention is based on a cycle of two or three sequential phases first comprising a treatment of the gases to be separated (module 1, an atmospheric gas-treatment (AGT) module), second, a separation of gases (module 2, an atmospheric gas-separation (AGS) module) and third, a purification of the separated gas (module 3, an atmospheric gas-purification (AGP)), the latter being optional depending on the characteristics of the gas flow enriched with the substance to be separated (as seen in FIG. 1).

By applying the same system for gas treatment, gas separation and gas purification (optional) with different adsorbent porous materials, previously selected, it is and can be used to separate any inlet gas flow to the system in order to enrich the final outlet flow in the previously selected gases, being applicable to any composition since the PSA adsorption/desorption process proposed, the equipment used and the porous materials proposed are inert and do not produce intermediate substances which are potentially dangerous or harmful to the environment. Likewise, the operating pressures and temperatures are relatively low and moderate (respectively) to pose a risk to the operation.

Module 1 accommodates the gases entering this phase in pressure, temperature and composition, such that from a first inlet flow (1) it gives the result of two outlet flows, a first dry gas flow prepared to enter the second phase of gas separation (13) and a second outlet flow made up of the first removed gases, mainly suspended particles, water vapor and sulfur oxides (12).

Module 2, by means of a process of separation and concentration by physical and chemical PSA adsorption, obtains from the first outlet flow (13) coming from module 1 two outlet flows: a third outlet flow (27) with a concentration of the gaseous substances to be extracted greater than those of the first inlet flow, and a fourth outlet flow (16) with a concentration of the gaseous substances to be extracted lower than those of the first inlet flow (13).

And finally, module 3, by means of a process of separation and concentration by physical and chemical PSA adsorption similar to that of the second phase, although adapted to the composition of the gas flow to be treated, which obtains from the third outlet flow coming from the previous phase (27) two outlet flows: a fifth outlet flow (44) with a concentration of the gaseous substances to be extracted greater than those of the third outlet flow coming from the previous phase, and a sixth outlet flow (34) with a concentration of the gaseous substances to be extracted lower than those of the third outlet flow coming from the previous phase.

Depending on the specific parameters of the method and the requirements of the regulations that must be met at all times, the method can have the three previous modules, only the first two, be iterative, repeating any of the three previous modules in several steps, such that the first outlet flow (13) from module 1 constitutes the inlet flow of each module 2; and the third outlet flow (27) of each module 2 is the inlet flow to each module 3.

The second outlet flow (12) from module 1 will be managed either as liquid waste or it will be able to be neutralized with bases such as NaOH or KOH, for the chemical stabilization thereof prior to being evacuated. The fourth (16) and sixth (34) outlet flows, being gaseous, will be managed according to the content thereof as value-added atmospheric gases or they will be released directly to the outside, and they will be biologically inert.

In the event that the substance is selected from greenhouse exhaust gases, the inlet flow (1) to module 1 can come from any flow comprising greenhouse gases, preferably at least one gas flow of combustion exhaust, hereinafter referred to as exhaust flow, for example, from thermal power plants with combustion of fossil fuels, biomass combustion plants, boilers that use fossil fuels or biomass to produce primary energy, etc.

Initially, said inlet flow (1) is directed, as the first inlet flow to module 1, in order to carry out the first gas treatment phase in which the temperature and pressure are controlled in order to dry said flow by removing water, nitrogen and sulfur oxides, unburned substances and other solids in suspension, preparing the first outlet flow (13) for the injection thereof into module 2, in which the gas-separation process is carried out, with a composition which enables the operation under design conditions thereof according to the specifications of the adsorbent material. The second outlet flow (12) incorporates the separated water, the sulfur oxides, the unburned substances, partially the nitrogen oxides and other solids in suspension removed from the inlet gas flow (1).

Module 2 treats the first outlet flow (13) from module 1 by means of a PSA adsorption/desorption process to separate the gases selected, enriching the third outlet flow (27) from module 2. The separation of gases occurs according to the selectivity of the adsorption process which has a certain adsorbent porous solid. In the preferred case, the porous material used is active and selective against $CO_2$ and CO.

The adsorption and desorption processes are performed in one or more adsorption/desorption reactors (14), in series, the adsorption process acting first, followed by that of PSA desorption, indefinitely repeating these processes in an alternating manner. In order to achieve a continuous operation of module 2, it is necessary to double the number of adsorption/desorption reactors (14), such that while half performs the adsorption process, the other half performs the PSA desorption process working in parallel.

During the adsorption process (FIG. 2), the first outlet flow (13) flows through the inner and outer surfaces of the adsorbent porous material arranged inside the adsorption/desorption reactors. The fourth outlet flow (16) is depleted in the selected gases and can be released to the outside with a composition very similar to that of the outside atmosphere, or by trying to have it recovered as industrial gases. The selected gases remain inside the adsorption/desorption reactors (14) adhered by means of Van der Waals forces, weak bonds and hydrogen bonds, among other forces of physical/chemical origin which are present. The adsorption process ends when the adsorbent porous material inside the adsorption/desorption reactors (14) becomes saturated and stops adsorbing the selected gases.

During the adsorption process, the adsorption/desorption reactors (14) which perform the adsorption process are connected to the first outlet flow (13) from module 1 and are isolated from the PSA desorption system. During the PSA desorption process, the adsorption/desorption reactors (14) are isolated from the first outlet flow (13) from module 1 and are connected to the vacuum system which will enable the extraction of the gases adhered to the adsorbent porous material contained therein in order to enrich the third outlet gas flow (27) from module 2, enriched in the selected gases.

The fourth outlet flow (16) from module 2 consists of the gas flow depleted in the selected gases coming from the adsorption/desorption reactors (14) which are performing the adsorption process, which will be able to be managed as atmospheric gases with added value, or it will be emitted directly to the outside atmosphere if it is biologically inert.

In Module 2, the desorbed gas stream follows three different steps.
  (a)=Step 1=First step of the proposed PSA desorption process. Recirculation of absorbed gases
  (b)=Step 2=Second step of the proposed PSA desorption process. Vacuum desorption.
  (c)=Step 3=Third step of the proposed PSA desorption process. Pulled desorption.

During the first step of the PSA desorption process the flow (21) is reinjected into the inlet gas flow to module 1, while the control system (45) of the system as a whole has it. Secondly, during the second step of the PSA desorption process, the gases are accumulated in several buffer tanks for storage before leaving this phase, constituting the third outlet gas flow (27) from module 2, ending when it is possible to desorb approximately the same mass of selected gases that was initially adsorbed during the adsorption process (FIG. 3 describes the evolution of the key parameters during the PSA desorption process proposed in the present invention).

The third step is repeated several times, as many as necessary to finish the second step, interrupting it, consisting of the reinjection of the gases desorbed and accumulated in the aforementioned tanks, for the injection thereof, as a flow (24) into the adsorption/desorption reactors (14) which are performing the PSA desorption process in an explosive manner, when the pressure thereof reaches a threshold value below a predetermined vacuum (approximately 80%), in order to pull the largest number of molecules from the selected gases and improve the behavior of the vacuum pumps used to perform the PSA desorption process. At the end of each of the third steps, the second step of the desorption process continues to be performed.

In the event that the concentration of the selected gases present in the third outlet flow (27) from module 2 is less than that required by specifications of the system, a module 3, based on the previous PSA adsorption/desorption process will be included.

The operation of the module 3 will be similar and in series to the operation of the previous module 2, using as inlet gas flow the third outlet flow (27) enriched in the selected gases coming from module 2, using the same (or different) adsorbent porous material as the one used in module 2, provided that it is selective towards the gases selected for the separation and purification thereof.

The sixth outlet gas flow (34) from the third gas purification phase may be reinjected to the adsorption/desorption reactors (31) which are performing the adsorption process in both module 2 and module 3; or be emitted directly to the outside atmosphere, depending on the composition thereof and whether or not it is biologically inert, as determined through the control system (45) of the invention.

In order to achieve the continuous operation of the system as a whole, modules 2 and 3 will each have half of the adsorption/desorption reactors (14), (31) performing the adsorption process, while the other half will be performing the PSA desorption process. When both processes end, the control system (4) will alternate the operation thereof, achieving that half of the adsorption/desorption reactors (14), (31) of each module are performing the adsorption process at all times, continuously and without affecting the flow rate of the first inlet flow (1) to module 1.

In the meantime, the other half of the adsorption/desorption reactors of each phase will be performing the described PSA desorption process. At all times, the control system (45) will attempt to adjust the adsorption ($t_{adsorption}$) and desorption ($t_{desorption}$) times as much as possible, such that it will always meet the condition that $t_{desorption} \leq t_{adsorption}$ in each of modules 2 and 3.

The threshold points or values of the concentration of the selected gases in the desorbed flows (27) and (44), the concentration of the selected gases in the inlet flow to the system (1), the amount of water and other greenhouse gases present in the inlet flow to the system (1), the pressure and temperature conditions thereof, the mass and/or volumetric concentrations thereof; and the adsorption and desorption times of the adsorption/desorption reactors (14), (31) of modules 2 and 3 are, apart from multiple signals internal to the system as a whole, the main inputs which govern the control system (45) of the invention.

It is important to note that the proposed device and method can, in theory, be used at any pressure and temperature, although, depending on the features, known in the state of the art, of the PSA adsorption/desorption systems using porous materials as adsorbent material, pressures below 10 bar(g) have been selected as the operating pressure range, and operating temperatures not higher than 50° C., in order to protect the porous material used, obtaining an acceptable performance of the system as a whole and reducing the operation and maintenance costs.

In the case of the adsorption steps to be performed by the adsorption/desorption reactors (14), (31), of modules 2 and 3, the system will try to optimize the adsorption process by maximizing the amount of the selected gases such that the adsorbed amount is maximized as much as possible, exceeding 95% of the amount present in the first inlet flow to the system and as close as possible to 100%.

The basic parameters of the method are as follows:
the nature and concentration of the substance or substances to be separated present in the first inlet flow (1) to module 1.
the minimum percentage by weight which is required to be removed of each substance, with respect to the percentage of said substance contained in the first inlet flow (1) to module 1.
the minimum concentration of each separate substance required for the third outlet gas flow (27) of module 2 or the fifth outlet gas flow (44) of module 3 (optional), as required.
The system as a whole will enable the installation and operation thereof regardless of the source of greenhouse gases, pressure, temperature and concentration of the selected gaseous substance, adapting the operation thereof automatically.
The system as a whole is modular, interchangeable, compact and scalable.

Based on said basic parameters, the operating pressure and temperature parameters of each of the three modules are selected, while with the mass concentration of the gases selected to be separated during the complete process, the different steps of the PSA desorption process will then be performed in modules 2 and 3 (optional), with the aim of achieving the mass concentration of the gases to be separated selected for the desired concentration and/or separation thereof, by means of reinjection processes in different points of the systems which make up the three modules, in order to achieve adsorption of the selected gases as much as possible in order to be separated from the main inlet gas flow (1) to module 1, increasing the adsorption and desorption yields of the system as a whole, by means of a complex control system (45).

By means of the method described in the present invention, a recovery of gaseous substances from gas flows is carried out with significant energy savings (around 45%), savings in equipment cost (around 75%) and savings in operation and maintenance costs (around 75%) compared to the methods for separating gases and capturing greenhouse gases currently in operation, as well as preventing the generation of products harmful for the environment, with the savings in carbon footprint and environmental impact that this implies.

Additionally, the method of the invention favors synergy between companies since the by-products of the method can be acquired as raw material by other companies.

PREFERRED EMBODIMENT OF THE INVENTION

Next, with reference to the attached FIG. 5, a preferred embodiment of the device of the invention is explained, applied to the recovery of a component gaseous substance from the inlet gas flow to the invention.

An inlet gas flow (1), mainly coming from fossil fuel combustion systems for obtaining primary energy, enters module 1 for the analysis thereof, modification in pressure, temperature and content in other greenhouse gases, impurities and water vapor. This flow (1) is mobilized from the installation in which it is generated by an impulsion system (2) and is led by means of a system of pipes for the inlet and treatment thereof in module 1, constituting the gas flow (3) the characteristics of which are similar to those of the flow (1), but with a constant flow rate in accordance with the features of the control system (45) of the invention.

The flow (3) has the following concentrations: $CO_2$ (1%-25%), water vapor (0%-25%), $O_2$ (0%-35%) and other, $N_2$, Ar, other greenhouse gases, unburned substances, ashes, etc., in accordance with the features of the previous combustion installation. The temperature range is between 60° C. and 800° C. and pressure is slightly above atmospheric pressure. The control system (45) depending on the characteristics of the flow (1) will manage the equipment of module 1 and the operation thereof in order to optimize the operation of the system as a whole.

The gas flow (3) is treated in a first group of gas exchangers (4) in order to reach a temperature of around 40° C. or less. The first group of exchangers uses water, air or any fluid (i) in order to cool the flow (3), obtaining an outlet coolant flow (iii) in accordance with the legal limits for the treatment or evacuation to the outside thereof.

Due to the features of the cooling process of the flow (3), the excess water present condenses, together with a portion of the greenhouse gases, unburned substances, ashes and other unwanted components, constituting the flow (6) of water to be subsequently treated. The outlet flow from this group of exchangers (5), at a temperature of around 40° C. or lower, is semi-dry with water content in saturation in accordance with the temperature thereof.

This gas flow is joined by the gas flow (21) coming from module 2, which will be explained later, constituting the flow (7), which is compressed by a compressor to pressures below 10 bar(g) in the compression system (8), at the outlet of which the gas flow (9) prepared for the inlet thereof into the drying system (10) is obtained.

The drying system (10) has a dryer that removes the water present in the flow (around 99.9%), obtaining the first outlet flow (13) from module 1 for the sending thereof to module 2. The flow (13) is modified to the temperature (20° C.-45° C.), pressure (1-9 bar(m)) and moisture (Approx. 0%) in order to optimize the adsorption process as much as possible. The drying system is cooled by a coolant fluid similar to the one used in the heat exchange group (4), using inlet (ii) and outlet (iv) flows in accordance with the legal limits for the treatment or evacuation thereof to the outside.

The drying system (10) produces a second outlet flow (11) in which the condensed water coming from the flow (9), other sulfur oxides, unburned substances, ash and other greenhouse gases are removed. The flows (6) and (11) join together and constitute the liquid flow (12) which is the second outlet flow from module 1, which is treated prior to the evacuation outside thereof or for the subsequent recovery thereof.

The operation of module 1 is adjusted by means of the control system (45) adapting the operation thereof at all times to the needs of the adsorbent material of modules 2 and 3; and the characteristics of the flow (1).

The outlet flow (13) from module 1 is injected into module 2 in the adsorption/desorption reactors (14) which are performing the adsorption process, according to the instructions of the control system (45). After passing through these adsorption/desorption reactors (14), the outlet flow of each one (15) is directed to a single outlet conduit from module 2 to be returned to module 1 in which, as flow (16) it is released to the outside (if it is not biologically active) or to the evacuation installation in the combustion system from which the flow (1) is initially taken.

In the other adsorption/desorption reactors which are performing the PSA desorption process, the outlet flow of the gases located inside the adsorption/desorption reactors (14) constitutes the flow (17), which has an enrichment in the selected gases for the variable separation thereof over time depending on the vacuum extraction process, going from a $CO_2$ concentration of 0.4% to approximately 65%-85% depending on the characteristics of the flow (1).

By means of the vacuum pumps (18), the flow (17) is extracted and driven by the compressor (20) in order to favor the injection thereof as flow (21) to module 1 for the mixing thereof with the flow (5) during the first phase of the desorption process described above, ending the function thereof when the control system (45) so determines. At this point, the flow (17) becomes the flow (22) which is stored in the first buffer tank (23) of module 2. Once the maximum filling pressure is reached, the rest passes as flow (25) to the second buffer tank (26) of module 2 from which the flow (27) is obtained for the extraction thereof to the outside or for the injection thereof as inlet flow to module 3.

The flow (24) starts from the first buffer tank (23) of module 2 and is used as a pulling flow in the third phase of the PSA desorption process described above and is injected directly into the adsorption/desorption reactors (14) which are performing the desorption process.

The operation of module 2 is adjusted by means of the control system (45) adapting the operation of the active systems located in module 1 at all times to the needs of average and maximum $CO_2$ concentration in the outlet flow from module 2 and for the purpose of optimizing the desorption process of the adsorption/desorption reactors (14) which perform the desorption process in module 2. Such active systems located in module 1 are shown within the dashed line 51 and may be thought of as atmospheric gas-separation (AGS) equipment of the atmospheric gas-treatment (AGT) module (i.e., module 1).

The outlet flow (27, 28) from module 2 before being injected into module 3 in the adsorption/desorption reactors (31) which are performing the adsorption process, according to the instructions of the control system (45), is mixed with the flow (36), constituting the flow (29), into which the flow (33) is mixed, in order to constitute the flow (30), which is the one that is finally injected as inlet flow to the adsorption/desorption reactors (31) which are performing the adsorption process in module 3. The flows (33) and (36) are explained below.

After passing through these adsorption/desorption reactors (31) the outlet flow from each adsorption/desorption reactor (32) is directed for the injection thereof to the other adsorption/desorption reactors as flow (33) for the mixture thereof with the flow (29) or it is carried by means of an outlet conduit from module 3 to be returned to module 1 in which, as flow (34) it is released to the outside (if it is not biologically active) or to the evacuation installation in the combustion system from which the flow (1) is initially taken, according to what is indicated by the control system (45) of the invention.

In the other adsorption/desorption reactors (31) which are performing the PSA desorption process, the outlet flow of the gases located inside the adsorption/desorption reactors constitutes the flow (39), which has an enrichment in the selected gases for the variable separation thereof over time depending on the vacuum extraction process, going from a $CO_2$ concentration of 65%-85% to approximately 95%-100% depending on the characteristics of the flow (1).

By means of the vacuum pumps (38), the flow (39) is extracted and driven by the compressor (37) in order to favor the injection thereof as flow (36) to the flow (28) in order to constitute flow (29) during the first phase of the desorption process described above, ending the function thereof when the control system (45) so determines. At this point, the flow (35) becomes the flow (39) which is stored in the first buffer tank (40) of module 3. Once the maximum filling pressure is reached, the rest goes as flow (42) to the second buffer tank (43) of module 3 from which the flow (44) is obtained for the extraction thereof to the outside.

The flow (41) starts from the first buffer tank (40) of module 3 and is used as a pulling flow in the third phase of the PSA desorption process described above and is injected directly into the adsorption/desorption reactors (31) which are performing the desorption process.

The operation of module 3 is adjusted by means of the control system (45) adapting the operation of the active systems located in module 1 at all times to the needs of average and maximum $CO_2$ concentration in the outlet flow from module 3 and for the purpose of optimizing the desorption process of the adsorption/desorption reactors which perform the desorption process in module 3. Such active systems located in module 1 are shown within the dashed line 52 and may be thought of as atmospheric gas-purification equipment of the atmospheric gas-treatment module (i.e., module 1).

The invention claimed is:
1. An installation for recovering gaseous substances from gas flows comprising:
   a first atmospheric gas-treatment (AGT) module equipped with:
     an inlet conduit of the gas flows which includes at least one substance to be recovered;
     a set of heat exchangers;
     a compression system;
     drying means;
     a first gas outlet conduit for mobilizing a first outlet flow towards an atmospheric gas-separation module after a modification thereof in composition, pressure and temperature;
     a second outlet conduit for mobilizing a liquid flow; and
     a second inlet conduit for receiving adsorbed gases in first adsorption/desorption reactors existing in an atmospheric gas-separation (AGS) module;
   at least one said AGS module equipped with:

a first gas inlet which includes at least one substance to be recovered, coming from a first outlet flow from the AGT module; which is connected to a first inlet conduit for transporting gases to the first adsorption/desorption reactors; the adsorption/desorption reactors being interconnected by respective pipes and valves adapted to support a first Pressure Swing Adsorption (PSA) adsorption/desorption process;

a first outlet conduit for mobilizing desorbed gas flow after the first PSA desorption process for the sending thereof to the AGT module in which the desorption process will be controlled by of a control system; and a second gas outlet depleted in selected gases coming from the first adsorption/desorption reactors which perform the adsorption process; and the control system of the installation, adapted in an operation thereof to control flows of gas so as to implement the first PSA adsorption/desorption process.

2. The installation for recovering gaseous substances from gas flows according to claim 1, further comprising:

an atmospheric gas-purification (AGP) module, equipped with:
a first inlet gas inlet which includes at least one substance to be recovered, coming from the second outlet from the AGT module, which is connected to a first inlet conduit for transporting to second adsorption/desorption reactors that are interconnected by respective pipes and valves adapted to support a second PSA adsorption/desorption process;

a first outlet conduit for mobilizing the desorbed gas flow after the second PSA desorption process for the sending thereof to the AGT module in which the desorption process will be controlled, by the control system;

wherein the AGT module further includes:
a third outlet conduit for sending the flow enriched with gases in at least one substance to be separated to the AGP module,
a third inlet conduit for receiving the adsorbed gases in the second adsorption/desorption reactors of the AGP module; and
a fourth outlet conduit for sending to the outside the flow of gases depleted in the at least one substance to be recovered.

3. The installation for recovering gaseous substances from gas flows according to claim 2, further comprising:
a set of sensors which enable the monitoring of pressure, temperature and concentration conditions, of the substance to be recovered, in the gas flow at the outlet towards the AGS module; and
the control system being adapted in an operation thereof to control the flows of the gas throughout the AGS module and/or the AGP module by acting on active systems located in the AGT module including AGS equipment of the AGT module and/or AGP equipment of the AGT module, respectively, based on pressure, concentration, moisture, and/or temperature characteristics provided by the set of the sensors.

4. The installation for recovering gaseous substances from gas flows according to claim 1, further comprising:
a set of sensors which enable the monitoring of the pressure, temperature, and concentration conditions, of the substance to be recovered, in the outlet flow; and
the control system being adapted in an operation thereof to control the average and maximum concentration, of the substance to be recovered, in the outlet flow of the AGS module by automatically acting on AGS equipment of the AGT module based on pressure, concentration, moisture, and/or temperature characteristics provided by the set of sensors.

5. The installation for recovering gaseous substances from gas flows according to claim 1, further comprising:
a set of sensors which enable the monitoring of the pressure, temperature, and concentration conditions, of the substance to be recovered, in the outlet flow;
the control system being adapted in an operation thereof to automatically control the average and maximum concentration, of the substance to be recovered, in the outlet flow of an atmospheric gas-purification (AGP) module; and
the control system being further adapted to automatically control the flows of the gas AGP module by acting on active systems located in the AGT module including AGP equipment of the AGT module, based on pressure, concentration, moisture, and/or temperature characteristics provided by the set of the sensors.

6. The installation for recovering gaseous substances from gas flows according to claim 1, further comprising:
an interconnection of one or more said AGT modules with one or more said AGS modules, wherein the outlet flow from each said AGT modules is the inlet flow of each said AGS modules.

7. The installation for recovering gaseous substances from gas flows according to claim 1, further comprising:
an interconnection of one or more said AGT modules with one or more said AGS modules and with one or more atmospheric gas-purification (AGP) modules, wherein the outlet flow from each said AGT modules is the inlet flow of each said AGS modules and the outlet flow from each said AGS modules is the inlet flow of each said AGP modules.

8. The installation for recovering gaseous substances from gas flows according to claim 1, further comprising:
a set of sensors which enable the monitoring of the pressure, temperature and concentration conditions, of the substance to be recovered, in the outlet flows; and
the control system being adapted in an operation thereof to control the average and maximum concentration, of the substance to be controlled, obtained in the outlet flows from the AGT module, from the AGS module and from an atmospheric gas-purification (AGP) module by automatically acting on active systems located in the AGT module, including AGS equipment of the AGT module and/or AGP equipment of the AGT module, based on pressure, concentration, moisture, and/or temperature characteristics provided by the set of the sensors.

9. The installation for recovering gaseous substances from gas flows according to claim 1, further comprising:
a set of sensors which enable the monitoring of pressure, temperature and concentration conditions, of the substance to be recovered, in the gas flow at the outlet towards an AGS; and
the control system which enables being adapted in an operation thereof to control the flows of the gas AGS module and/or an atmospheric gas-purification (AGP) module by acting on active systems located in the AGT module including AGS equipment of the AGT module and/or AGP equipment of the AGT module based on pressure, concentration, moisture, and/or temperature characteristics provided by the set of the sensors.

10. The installation for recovering gaseous substances from gas flows according to claim 2, further comprising:

a set of sensors which enable the monitoring of the pressure, temperature, and concentration conditions, of the substance to be recovered, in the outlet flow;

the control system being adapted in an operation thereof to automatically control the average and maximum concentration, of the substance to be recovered, in the outlet flow of an atmospheric gas-purification (AGP) module; and the control system being further adapted to automatically control the flows of the gas AGP module by acting on active systems located in the AGT module including AGP equipment of the AGT module, based on pressure, concentration, moisture, and/or temperature characteristics provided by the set of the sensors.

11. The installation for recovering gaseous substances from gas flows according to claim 2, further comprising:

an interconnection of one or more said AGT modules with one or more said AGS modules, wherein the outlet flow from each said AGT modules is the inlet flow of each said AGS modules.

12. The installation for recovering gaseous substances from gas flows according to claim 2, further comprising:

an interconnection of one or more said AGT modules with one or more said AGS modules and with one or more atmospheric gas-purification (AGP) modules, wherein the outlet flow from each said AGT modules is the inlet flow of each said AGS modules and the outlet flow from each said AGS modules is the inlet flow of each said AGP modules.

13. The installation for recovering gaseous substances from gas flows according to claim 6, further comprising:

an interconnection of one or more said AGT modules with one or more said AGS modules and with one or more atmospheric gas-purification (AGP) modules, wherein the outlet flow from each said AGT modules is the inlet flow of each said AGS modules and the outlet flow from each said AGS modules is the inlet flow of each said AGP modules.

14. The installation for recovering gaseous substances from gas flows according to claim 11, further comprising:

an interconnection of one or more said AGT modules with one or more said AGS modules and with one or more atmospheric gas-purification (AGP) modules, wherein the outlet flow from each said AGT modules is the inlet flow of each said AGS modules and the outlet flow from each said AGS modules is the inlet flow of each said AGP modules.

15. The installation for recovering gaseous substances from gas flows according to claim 3, further comprising:

a set of sensors which enable the monitoring of the pressure, temperature and concentration conditions, of the substance to be recovered, in the outlet flows; and the control system being adapted in an operation thereof to control the average and maximum concentration, of in the substance to be controlled, obtained in the outlet flows from the AGT module, from the AGS module and from an atmospheric gas-purification (AGP) module by automatically acting on active systems located in the AGT module, including AGS equipment of the AGT module and/or AGP equipment of the AGT module, based on pressure, concentration, moisture, and/or temperature characteristics provided by the set of the sensors.

16. The installation for recovering gaseous substances from gas flows according to claim 5, further comprising:

a set of sensors which enable the monitoring of the pressure, temperature and concentration conditions, of the substance to be recovered, in the outlet flows; and the control system being adapted in an operation thereof to control the average and maximum concentration, of the substance to be controlled, obtained in the outlet flows from the AGT module, from the AGS module and from an atmospheric gas-purification (AGP) module by automatically acting on active systems located in the AGT module, including AGS equipment of the AGT module and/or AGP equipment of the AGT module, based on pressure, concentration, moisture, and/or temperature characteristics provided by the set of the sensors.

17. The installation for recovering gaseous substances from gas flows according to claim 7, further comprising:

a set of sensors which enable the monitoring of the pressure, temperature and concentration conditions, of the substance to be recovered, in the outlet flows; and the control system being adapted in an operation thereof to control the average and maximum concentration, of to be controlled in the substance to be controlled, obtained in the outlet flows from the AGT module, from the AGS module and from an atmospheric gas-purification (AGP) module by automatically acting on active systems located in the AGT module, including AGS equipment of the AGT module and/or AGP equipment of the AGT module, based on pressure, concentration, moisture, and/or temperature characteristics provided by the set of the sensors.

18. The installation for recovering gaseous substances from gas flows according to claim 9, further comprising:

a set of sensors which enable the monitoring of the pressure, temperature and concentration conditions, of the substance to be recovered, in the outlet flows; and the control system being adapted in an operation thereof to control the average and maximum concentration, of the substance to be controlled, obtained in the outlet flows from the AGT module, from the AGS module and from an atmospheric gas-purification (AGP) module by automatically acting on active systems located in the AGT module, including AGS equipment of the AGT module and/or AGP equipment of the AGT module, based on pressure, concentration, moisture, and/or temperature characteristics provided by the set of the sensors.

* * * * *